United States Patent [19]

Rose

[11] 4,120,136

[45] Oct. 17, 1978

[54] IMPLEMENT SUPPORTING AND LIFTING LINKAGE

[75] Inventor: Jack Howard Rose, Livonia, Mich.

[73] Assignee: Massey-Ferguson Inc., Detroit, Mich.

[21] Appl. No.: 756,022

[22] Filed: Dec. 27, 1976

[51] Int. Cl.² ............................................. A01D 35/12
[52] U.S. Cl. ..................................... 56/17.1; 56/15.8; 56/DIG. 22
[58] Field of Search ............... 56/17.1, DIG. 22, 15.9, 56/15.8, 15.2, 15.3, 16.3

[56] References Cited

U.S. PATENT DOCUMENTS

| | | | |
|---|---|---|---|
| 3,063,226 | 11/1962 | Pfauser | 56/17.1 X |
| 3,154,903 | 11/1964 | Smith | 56/15.8 |
| 3,187,821 | 6/1965 | Kamlukin | 172/103 |
| 3,283,486 | 11/1966 | Marek et al. | 56/16.3 |

Primary Examiner—John F. Pitrelli
Assistant Examiner—G. Lee Skillington
Attorney, Agent, or Firm—William R. Nolte

[57] ABSTRACT

Linkage for supporting a mower beneath a tractor, having first and second pairs of interconnected links and with the first pair pivotally mounted at their forward ends to the front axle of tractor and rockable about a fore and aft horizontally disposed axis. The second pair of links is connected to the frame of the tractor. Foot pedal means connected to the linkage adjusts height of mower in opposition to force of spring means attached to linkage and frame which tends to urge linkage into folded condition beneath tractor frame. Rocking action of front axle through linkage causes mower to follow ground contour to provide an even cut.

12 Claims, 5 Drawing Figures

IMPLEMENT SUPPORTING AND LIFTING LINKAGE

This invention relates to an implement support and lifting linkage for mounting the implement such as a mower beneath a tractor.

Implements such as mowers mounted from small garden tractors are often elevated to various operating positions by means of a hand operated lever. The weight of the implement so suspended beneath the tractor can be considerable thus requiring substantial lifting effort on the part of the operator to overcome the effects of gravity when adjusting the implement to desired operating elevations. Moreover the lifting levers employed on such tractors are often awkward and provide inadequate leverage thereby imposing undue strain on the operator.

It is an object of this invention, therefore, to provide an improved implement supporting and lifting linkage for a tractor which avoids one or more of the disadvantages of the prior-art arrangements and which has an improved ease of operation.

It is a further object of this invention to provide an improved implement supporting and lifting linkage for a tractor which includes spring suspension means which normally force the implement upwardly and wherein lowering of the implement is in opposition to said spring suspension means.

It is still another object of this invention to provide an improved implement supporting and lifting linkage having spring suspension means which can be adjusted from side to side for leveling the implement.

It is still another object of this invention to provide in a tractor having a rockable axle, an improved implement supporting and lifting linkage attached to the axle thereby assuring that the implement follows the ground contours to secure an even cut.

It is still another object of this invention to provide an improved implement supporting and lifting linkage having spring suspension means which normally force the mower upwardly, and foot operated lever means movable by the operator in opposition to said spring means to secure a desired operating height of the implement.

In accordance with the invention, improved support means are provided for suspending a mower beneath a tractor. The support includes draft link means mounted for vertical swinging movement about an axis at one end of the tractor. An implement beneath the frame of the tractor, is secured to said draft links. Spring means connected to the draft links and the frame urge the draft links upwardly. Additional link means pivoted to the frame, the draft links, and the mower aid in supporting the mower. Operator actuated foot pedal means on frame, and disposed in lowering relation to the draft link means, are effective to swing the draft links about said axis to position the implement in opposition to the upward urging of said spring means.

For a better understanding of the present invention, together with other and further objects thereof, reference is had to the following descriptions taken in conjunction with the accompanying drawings and its scope will be pointed out in the appended claims.

Figure 1:
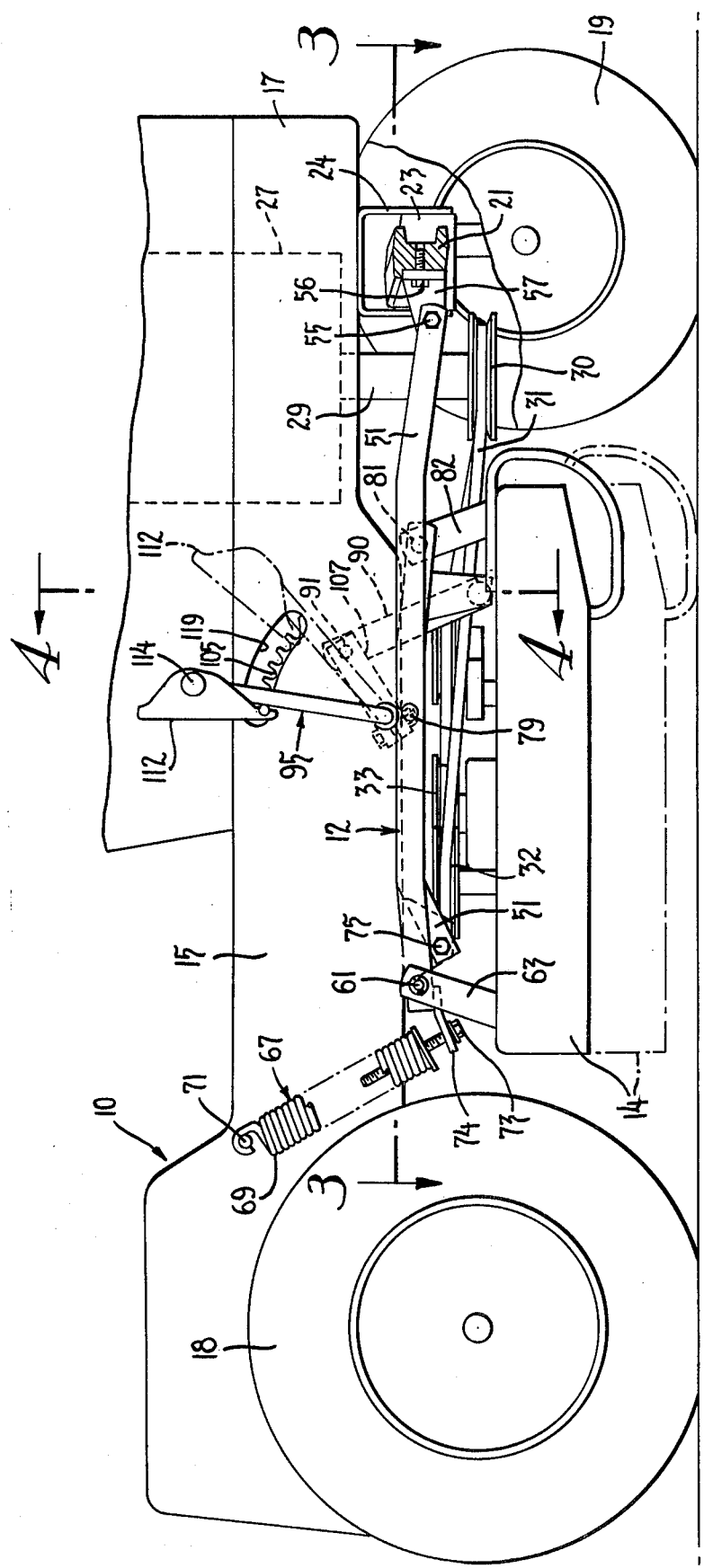
FIG. 1 is a side elevational view, partly schematic, of a tractor showing the novel linkage supporting an implement such as a mower beneath the tractor.

Referring to FIG. 1 of the drawings, there is shown a tractor 10, partially schematic, with the lift linkage 12 embodying the present invention, and supporting a mower 14 there beneath. The tractor includes a longitudinal chassis frame 15, having side sills 16, 17, rear traction wheels 18, and front wheels 19 suitably mounted on opposite end portions of a tiltable axle 21. The axle is journalled for pivotal movement by bearing 23 affixed to transverse frame member 24. The bearing is disposed so that the axle is enabled to tilt about an axis 25 parallel to longitudinal center line of the vehicle. The tractor which includes an engine 27 suitably mounted to the frame provides an output shaft 29 with a pulley 30. A belt 31 trained about pulleys 30, 32, 33 transmits power from the engine to suitably drive the mower. The power train for the mower which is of rectangular configuration, forms no part of the present invention.

Figure 2:
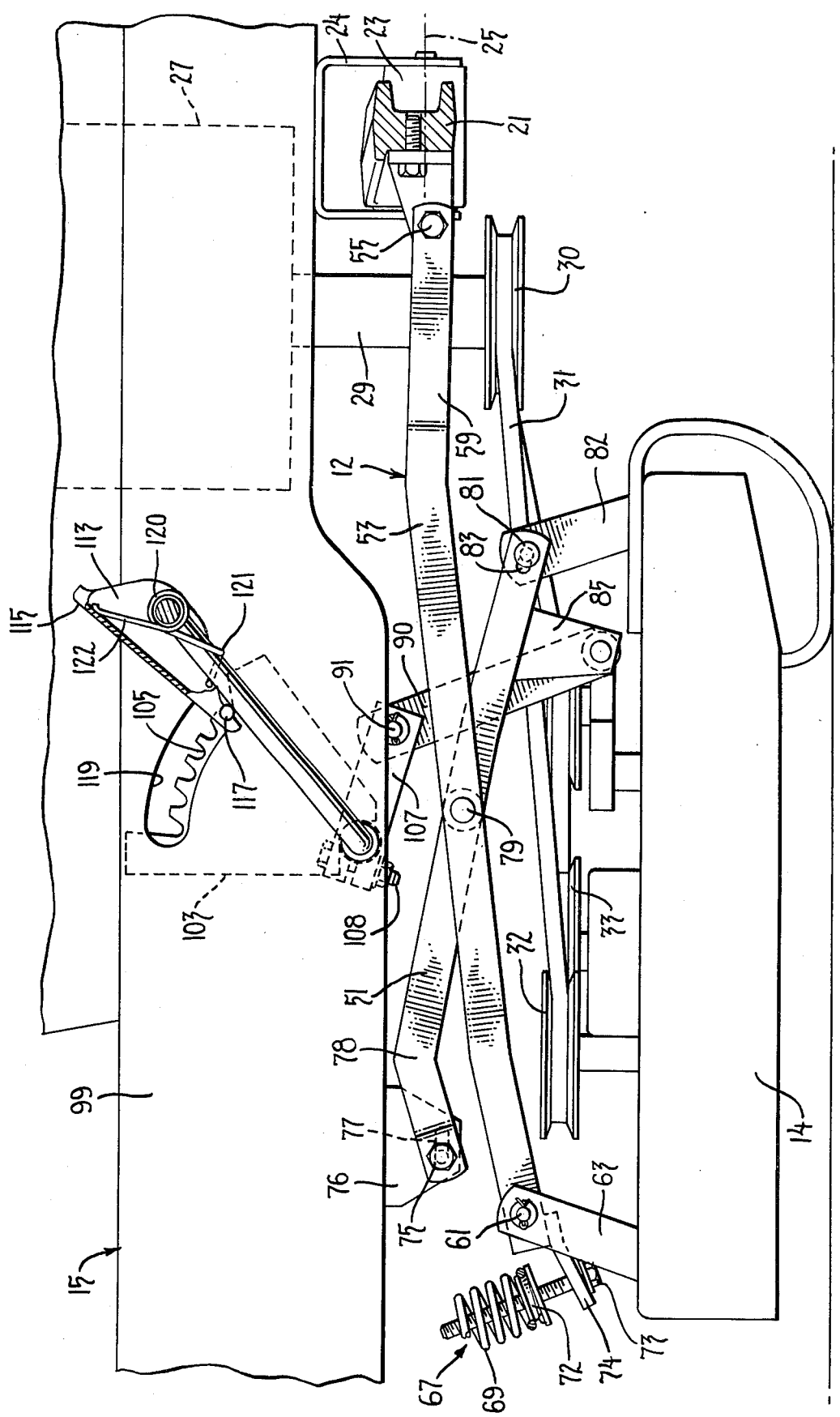
FIG. 2 is an enlarged side elevational view of the lift supporting linkage showing the mower in a lowered cutting position beneath the tractor.
Figure 3:
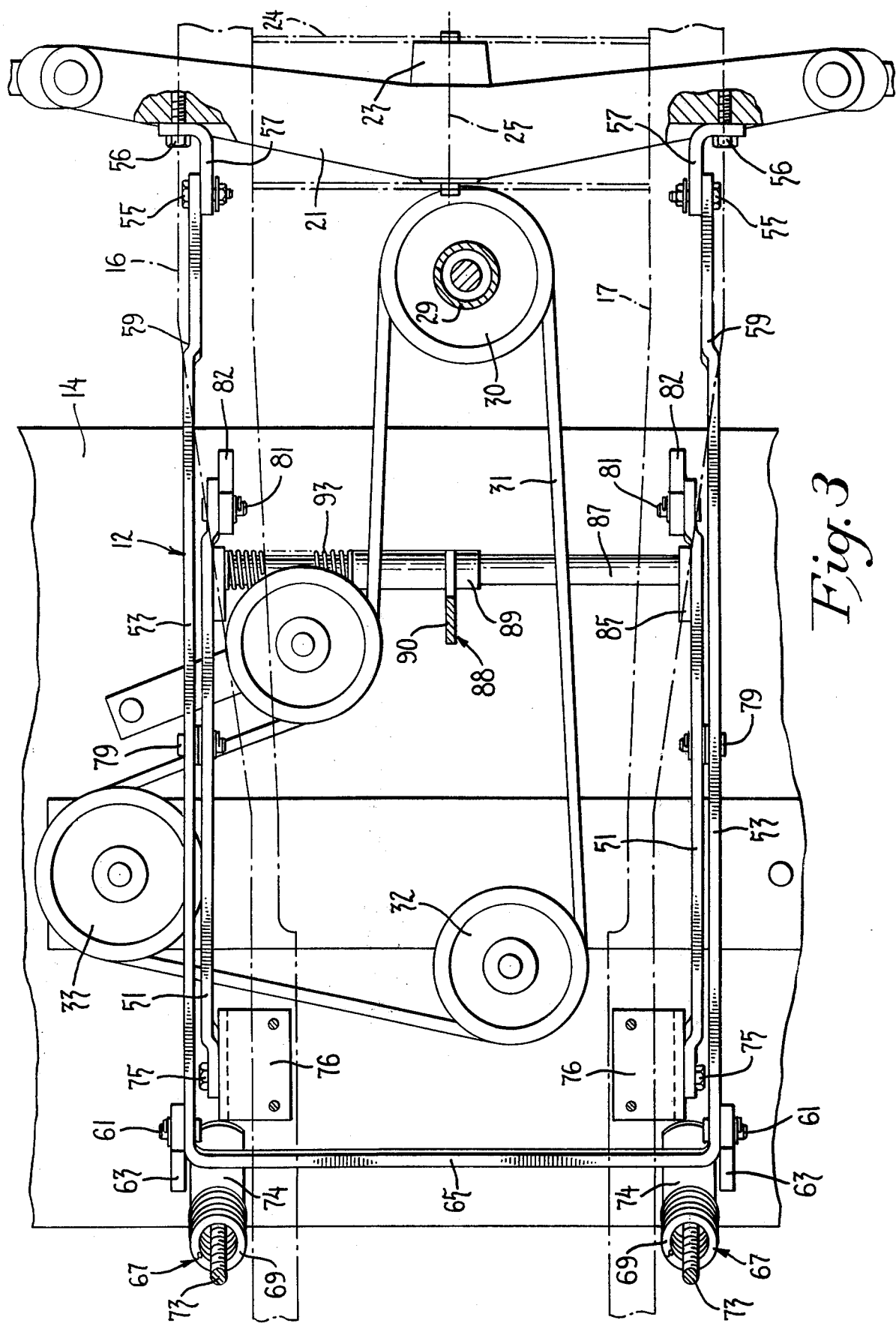
FIG. 3 is an enlarged plan view of the mower and mounting linkage taken substantially on the line 3—3 of FIG. 1.

With reference to FIGS. 2 and 3 it is seen that the novel support linkage generally designated 12 includes a pair of laterally displaced substantially horizontally extending lift arms 51, and draft arms 53, which at their forward ends are pivoted as at 55 to brackets 57. The brackets 57 are suitably secured adjacent opposite end portions of axle 21 as by bolts 56. The draft arms 53 are bowed slightly downwardly as at 59 to clear the forward portion of the mower. The arms 53 extend over the top of the mower and are pivotally connected as at 61 to mower bracket support 63 extending upwardly from the rear portion of the deck of the mower. The arms 53 extend rearwardly a slight distance beyond the aforementioned pivots 61 and are joined by a transverse connecting portion 65 which together with the arms 53 constitute a U-shaped draft frame. Resilient means 67 in the form of a pair of coil springs 69 connects each side of the U-shaped draft frame to corresponding side sills 16, 17 of the tractor frame 15. The upper portion of each spring is secured to the frame by means of a post 71. The lower convolutions of the spring have affixed thereto as by welding a nut 72 which in turn receives an adjustable bolt 73. The bolt is passed through a suitable aperture in bracket 74 which is affixed to the under surface of the draft frame at the intersections of the arm 53 and transverse portion 65. The resilient means 67 are effective to normally urge the draft frame upwardly to a folded position of the linkage in which the mower is inoperative as illustrated in FIG. 1.

The complemental lift links 51 of the scissors linkage combination 12 are pivotally connected at their rear portions by pivots 75 to brackets 76 secured to the undersides of frame 15. The bracket includes an elongated aperture as at 77 to permit limited forward and aft movement of pivot element 75. The links 51 are slightly bowed as at 78 and extend forwardly over the deck of the mower. Each link 51, intermediate its length, is pivoted as at 79 to an associated draft arm 53. The extremities of arms 51 are pivotally connected as at 81 to upright bracket 82 integral with the forward portion of the mower. The forward extremity of arm 51 includes an elongated aperture 83 to enable limited fore and aft travel of pivot 81 therein as the mower is lowered from its raised full line position shown in FIG. 1 to its lowered operative position shown in FIG. 2. The forward portions of links 51 right and left, include downwardly depending legs 85 which are interconnected by means of a transverse shaft 87; see FIGS. 3, 4. A pivot link assembly 88 is mounted for pivotal and sliding axial movement on shaft 87. The latter assembly includes a tube 89 encircling shaft 87 for rotational and axial movement therealong and a link 90 affixed at one of its ends normal to the outer periphery of the tube as by welding. The other end of the link 90 includes a pin 91 disposed parallel to the axis of shaft 87 and an integral handle portion 92 spaced from and parallel with link 90. A coil compression spring 93 also encircling transverse shaft 87 is affixed at one of its ends adjacent one end of the shaft 87 and abuts at its other end the shoulder of tube 89 to urge the latter in engagement with operator actuated foot lever means 95 for lowering the linkage 12 and mower 14 against the upward urging of spring means 67 as hereinafter described.

The foot lever means includes a rod-like crank 96 comprising an upright portion 97 and a base portion 98 portion suitably passed through the vertical wall 99 of the side frame 15 and journalled for rotation in bearing 101 suitably affixed to the frame. The bearing is joined at one of its ends to an upright quadrant plate 103, see FIG. 5, having a plurality of notches. The base portion 98 of the rod extends through the bearing 101 toward the center line of the tractor. The extremity of the base portion has affixed thereto an arm 107 which is suitably clamped thereon as by bolt means 108. See also FIG. 2. The external surface of extremity of the base portion of the rod includes serrations 109 and the internal complemental aperture of the arm is likewise serrated so as to preclude relative movement between the base portion and the arm when the latter is clamped thereon. The outer end of the clamping arm 108 is suitably apertured to receive the previously mentioned pin 91 carried by lever arm 90 which is spring loaded to maintain engagement of the pin within the aperture.

Figure 4:
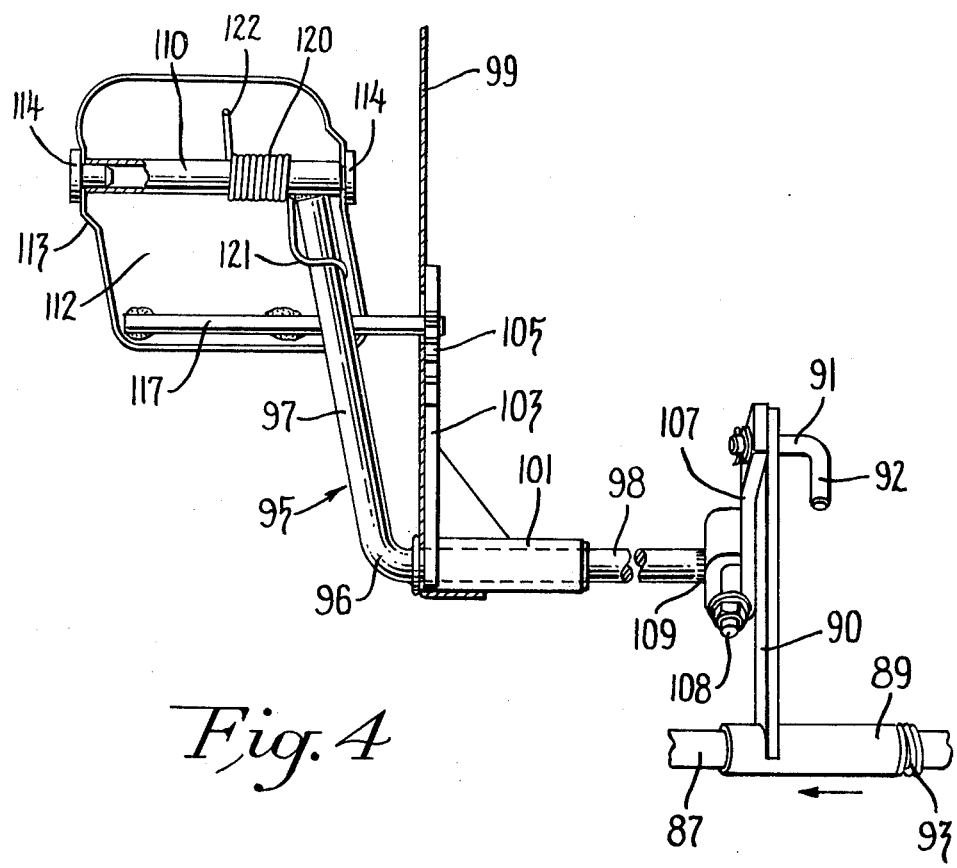
FIG. 4 is a sectional view taken along the lines 4—4 of FIG. 1 and illustrating the foot pedal apparatus attached to a side frame of the tractor.
Figure 5:
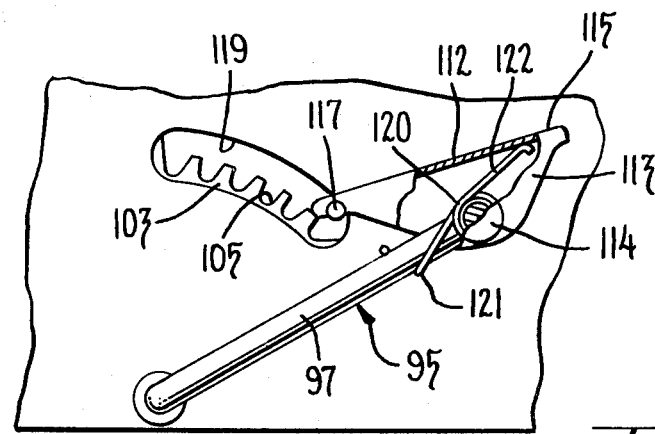
FIG. 5 is an enlarged side elevational view partially in section of the foot pedal for controlling the supporting linkage.

Still referring to FIGS. 4 and 5 it is observed that the hollow tube portion 110 disposed parallel to base portion 98 is rigidly affixed to the extremity of arm 97 to carry a rotatable pedal in the form of a plate 112. The latter pedal include apertured ear portions 113. Pins 114 passed through said apertures and through opposite end openings in tube 110 serve to restrain and mount the pedal for pivotal movement about the axis of said tube 110. A transverse rod 117 disposed parallel to the tube 110 is affixed to the lower surface of the pedal. The rod is of a sufficient length to extend through arcuate slot 119 in vertical wall 120 of side frame 15 for engagement with arcuately arranged notches 105 of quadrant plate 103. A spring 120 encircling tube 110, with one of its extremities 121 thereof wrapped around upright arm 97 and its other extremity 122 engaging the inner face of pedal 112, is effective to normally urge the pedal in a counter clockwise direction as seen in FIG. 5. Such clockwise rotation will cause rod 119 to engage a predetermined notch 105 of quadrant plate 103.

In operation when it is desired to change the elevation of the mower from its "up" position to a lower position as shown in FIG. 2 the operator applies his foot to the pedal 115 in a forward direction. The force so applied will rotate the pedal about the axis of tube 110 in a clockwise direction to free the rod 117 from engagement with the topmost notch 105 in quadrant plate 103. With the pedal so freed, the operator may then apply a sufficient force to rotate arm 97 in a clockwise direction so that it assumes the position shown in FIG. 5. This action through arm 107, lever 90, and transverse shaft 87 forces the downward rotation of lift links 51 about pivot 75. Since links 51 are connected to draft links 53 by pivot 79, links 53 are likewise forced downward about pivots 55 and against the upward urging of coil springs 69 attached to the rear portions of the draft links 53. Upon relaxing the force on the toe portion 113 of pedal 11 arm 122 operates to rotate pedal 112 in a counter clockwise rotation to position rod 117 within the margins of the lowermost notch 105. Thereafter upon the operation releasing pressure on the pedal 112 the springs 69 are effective to rotate the arm 97 through a slight distance in a counter clock direction so that the arm 97, and mower 14 assumes the position shown in FIG. 2. Various intermediate positions of elevation of the mower may be obtained in a similiar manner.

Having now described my invention, what I claim as new and desire to secure by Letters Patent is:

1. In a support for a mower beneath a tractor having a frame and an axle, scissor linkage means including draft link means and lift link means pivoted one to the other above said mower, means supporting said draft link means to said axle beneath said frame for vertical swinging movement, means supporting said lift link means to said frame for vertical swinging movement, pivot means connecting one portion of said mower to said draft link means and another pivot means connecting another portion of said mower to said lift link means, resilient means connected at one end to said frame and at its other end to said scissor linkage means to urge said scissor linkage and said mower upwardly to thereby overcome the effects of gravity acting thereon, lever means connected to said lift link means and pivotally mounted to said frame for moving said lift link means and said mower in relation to said frame, and foot treadle means connecting to said lever means for moving and maintaining said lever means in predetermined positions corresponding to predetermined elevations of said mower.

2. In a support for a mower as set forth in claim 1 wherein said tractor frame includes oppositely disposed side sills, and wherein said resilient means constitutes coil spring means connected to each side sill.

3. In a support for a mower as set forth in claim 2 wherein each coil spring means includes an adjustment means to vary the elevation of said draft link means adjacent one side sill relative to the other side sill to thereby level the mower.

4. In a support for a mower as set forth in claim 3 wherein said draft link means comprise a U-shaped frame having side arms disposed parallel to said side sills and connected at their free ends to opposite and portions of said axle, and including a transverse base portion connecting said side arms and said coil spring means.

5. In a support for a mower as set forth in claim 3 including bearing means for mounting said axle to said frame for pivotal movement about a horizontal fore and aft disposed axis, thereby to enable said mower attached to said draft link means to follow the ground contour and provide an even cut as said front axle rotates due to variations in elevation of the ground surface.

6. In a support for a mower as set forth in claim 1 including foot treadle means associated with said lever means, notched quadrant means affixed to said frame, said treadle including pin means engageable with said quadrant to determine the elevation of said lift links and said mower.

7. In a support for a mower as set forth in claim 1 wherein said lift link means supporting the front portion of said mower include spaced parallel side arm portions inter-connected by means of a transverse bar adjacent the front portion of said mower, and lever means connected to said bar and to said lever means.

8. In the support for a mower as set forth in claim 7 wherein said lever means connected to said shaft includes a sleeve element and a lever arm affixed thereto, and wherein said sleeve is movable axially thereon and rotably therewith, and including spring means encircling said shaft and coacting with said side arm and said sleeve element to urge the sleeve carrying said lever into engagement with said foot pedal lever.

9. In the support for a mower as set forth in claim 8 wherein said lever for swinging said lift link means in opposition to said resilient means includes a lever affixed to a transverse shaft journalled for rotation in said side frame, and further includes arm means inter-connecting said last named lever means with said lever means.

10. In the lifting and supporting linkage means as set forth in claim 9 wherein said foot treadle means includes a notched quadrant and a treadle having a pin engageable with said notches, and means pivotally mounting said treadle to enable engagement and disengagement of said pin with notched portions of said quadrant.

11. In a support for a mower as set forth in claim 1, said frame of said tractor having opposite side sills, and wherein said resilient means includes coil spring means disposed on opposite sides of said mower and mounted between said side sill members and said scissors linkage means.

12. In a support for a mower as set forth in claim 11, said tractor including an axle mounted for pivotal movement about a horizontal axis disposed parallel to the longitudinal axis of said tractor, said axle including outer and portions, and means pivotally connecting said scissors linkage means to said outer and portions of said axle to thereby enable said mower to follow the ground contour and provide an even cut as said front axle rocks due to change in elevation of the ground surface.

* * * * *